METHOD OF MAKING A LUMINESCENT DIODE

Filed April 13, 1970 2 Sheets-Sheet 1

INVENTORS
NAOZO WATANABE
KUNIO KANEKO
MASASI DOSEN
BY Hill, Sherman, Meroni, Gross & Simpson
ATTORNEYS Sept. 5, 1972 MASASI DOSEN ET AL 3,689,330

METHOD OF MAKING A LUMINESCENT DIODE

Filed April 13, 1970 2 Sheets-Sheet 2

INVENTORS
NAOZO WATANABE
KUNIO KANEKO
MASASI DOSEN
BY
ATTORNEYS

United States Patent Office
3,689,330
Patented Sept. 5, 1972

3,689,330

METHOD OF MAKING A LUMINESCENT DIODE

Masasi Dosen and Kunio Kaneko, Kanagawa, and Naozo Watanabe, Tokyo, Japan, assignors to Sony Corporation, Tokyo, Japan Filed Apr. 13, 1970, Ser. No. 27,794
Claims priority, application Japan, Apr. 18, 1969, 44/30,117
Int. Cl. H01l 7/38
U.S. Cl. 148—171 6 Claims

ABSTRACT OF THE DISCLOSURE

A method of making a luminescent diode including using gallium phosphide substrate and a melt of gallium phosphide. The substrate and the melt are disposed in a first boat within a fused quartz tube. The boat is inclined in such a manner that the melt is kept separate from the substrate. A second boat is provided within the tube and gallium plus gallium trioxide is placed in the second boat. First and second furnaces are provided about the tube in the vicinity of the respective boats. The gallium plus gallium trioxide forms gallium monoxide when heated. A carrier gas such as nitrogen is passed through the tube and carries the gallium monoxide into the vicinity of the boat containing the melt of gallium phosphide. As a result, the oxygen becomes doped into the melt. The tube is then inclined in such a way as to cause the melt to extend over the substrate and form an epitaxial growth upon cooling. The substrate contains an N type impurity such as tellurium, and during the growth of the epitaxial layer, a vapor containing a P type material such as zinc is added into the layer to form a PN junction. In this way, improved doping of oxygen into the junction which is required for a luminescent diode is achieved.

BACKGROUND OF THE INVENTION

Conventional methods of forming a luminescent diode comprises the steps of providing a substrate which contains an N type material such as tellurium and providing a melt containing a P type material such as zinc. Both the melt and the substrate are gallium phosphide. The melt also contains gallium and gallium trioxide. When the melt is caused to overlie the substrate, a PN junction is formed on cooling.

It is known that the red emission of a gallium phosphide diode is caused by radiative transition between zinc and oxygen. However, due to the much higher diffusion rate of zinc than oxygen, insufficient quantities of oxygen have become doped into the PN junction making it impossible to produce an efficient luminescent diode of the type described. It is apparent therefore that it would be desirable to provide a method for increasing the doping of oxygen into the PN junction and thereby increasing the efficiency of the luminescent diode.

Field of the invention

The field of art to which this invention pertains is luminescent diodes and in particular to a method of forming a highly efficient luminescent diode and especially to a method of increasing the doping of oxygen into the PN junction of such diodes.

SUMMARY OF THE INVENTION

It is an important feature of the present invention to provide an improved luminescent diode.

It is also an important feature of the present invention to provide a method for improving the efficiency of a luminescent diode.

It is a principal object of the present invention to provide a method to improve the doping of oxygen into the PN junction of a luminescent diode.

It is also an object of the present invention to provide a method for forming a diode from a gallium phosphide substrate and a gallium phosphide melt which is highly efficient as a luminescent diode.

It is another object of the present invention to provide a method for forming a luminescent diode including the step of using a carrier gas to dope oxygen into a gallium phosphide melt.

It is a further object of the present invention to provide a method for forming a gallium phosphide luminescent diode including the step of doping oxygen into a gallium phosphide melt prior to the forming of an epitaxial growth on a substrate.

It is also an object of the present invention to provide a gallium phosphide luminescent diode as described above wherein one of the two impurities in the material is introduced as a vapor after the doping of oxygen into the gallium phosphide melt and during the formation of the epitaxial growth at the surface of the substrate.

It is yet another object of the present invention to provide a gallium phosphide luminescent diode as described above wherein the oxygen which is doped into the gallium phosphide melt is produced by the heating of gallium and gallium trioxide in the presence of the carrier gas nitrogen.

These and other objects, features and advantages of the invention will be readily apparent from the following description of preferred embodiments thereof, taken in conjunction with the accompanying drawings, although variations and modifications may be effected without departing from the spirit and scope of the novel concepts of the disclosure.

BRIEF DESCRIPTION OF THE DRAWINGS

FIG. 7 illustrates several graphs plotted for different temperatures of the furnace.

DESCRIPTION OF THE PREFERRED EMBODIMENTS

The present invention relates to a method of producing a gallium phosphide luminescent diode and in particular to a method of producing such a diode having a high luminescence effiicency. In the past it has been difficult to increase the efficiency of such diodes due to the difficulty of doping oxygen into the PN junction. By the present invention, however, oxygen is doped into the melt prior to the forming of the diode with the assistance of a carrier gas. The entire operation is accomplished in an open tube for the tractability of the apparatus.

In the prior art systems, the oxygen and the P type impurity were attemtped to be doped in the epitaxial layer to form the PN junction at the interface. However, due to the increased diffusion rate of the P type impurity in comparison to the diffusion rate of the oxygen, insufficient oxygen became doped into the PN junction resulting in the inefficiency of the luminescent diode.

In the method according to the present invention, oxygen is doped directly into the melt and the P type impurity is later added to form the junction during the formation of the epitaxial layer between the substrate and the melt.

A single crystal of gallium phosphide is easily obtained commercially, and since a gallium phosphide luminescent diode emits a visible light effectively, gallium phosphide has been recently used as a substrate for luminescent diodes. The emission of the red light of a gallium phosphide diode is caused by radiative transition between zinc and oxygen. To improve the luminescence efficiency of the diode, it is necessary to form pairs of these impurities in the vicinity of the PN junction.

The PN junction of a gallium phosphide luminescent diode is generally formed by a liquid phase epitaxial growth. The prior art method of making such a PN junction is illustrated in FIGS. 1, 2 and 3.

Figure 1:
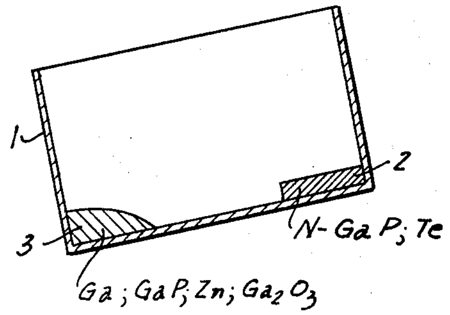
Fig. 1 (PRIOR ART)
FIG. 1 is an illustration of a boat which is used in a first step of a prior art method of forming a luminescent diode.

In FIG. 1, a boat 1 is shown inclined to the left and having a substrate 2 of gallium phosphide containing a tellurium as N type impurity. The boat 1 also contains a melt of gallium, gallium phosphide, zinc, and gallium trioxide.

The boat 1 is generally formed of carbon and placed in a furnace (not shown). The boat is heated to a temperature of approximately 1100 degrees centigrade.

Figure 2:
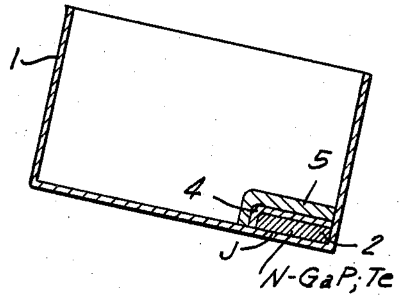
Fig. 2 (PRIOR ART)
FIG. 2 is an illustration of the boat of FIG. 1 with a different inclination to further illustrate the prior art method of forming a luminescent diode.
Figure 3:
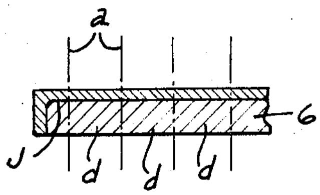
Fig. 3 (PRIOR ART)
FIG. 3 illustrates the appearance of a luinescent diode formed according to the techniques of FIGS. 1 and 2, and showing the points at which the diode is cut to form smaller diode elements.

FIG. 2 shows the boat 1 inclined to the right and cooling. The melt 3 has formed a layer 5 over the substrate 2. An epitaxial layer 4 is gradually formed on the substrate 2 by liquid epitaxial growth from the melt 3. Simultaneously, a PN junction J is formed in the substrate 2 by diffusion of zinc during the liquid epitaxial growth. The region 5 indicates the excess of the melt 3 which is normally a liquid at room temperature and which may be readily removed from the surface of the diode. This excess is a mixture of liquid gallium, gallium phosphite precipitates and small amounts of other impurities.

The completed diode is shown in FIG. 3 with the excess of the melt wiped away. The diode takes the form of a pellet 6 which may then be cut at the doted lines *a* into many pieces of diodes.

Since the diffusion coefficient of zinc is much greater than that of oxygen, sufficient oxygen is not doped in the vicinity of the PN junction J of the diode produced by the prior art methods shown in FIGS. 1, 2 and 3. Accordingly, a high efficient luminescent diode cannot be made by the conventional prior art methods.

In the above described prior art method, if the epitaxial process is obtained in an open tube, zinc and oxygen contained in the melt 3 tends to disperse and to be wasted rather than doped efficiently near the junction. Even if the epitaxial process is obtained in a sealed tube, oxygen is not doped into the vicinity of the PN junction J because of the much higher diffusion rate of the zinc.

Since the vapor pressure of gallium monoxide is higher than that of gallium trioxide, gallium trioxide which is contained in the melt is reduced to gallium monoxide to make oxide available as a vapor phase. The vapor pressure of gallium monoxide is 0.4 of atmospheric pressure at 1150 degrees centigrade which is much higher than gallium and gallium phosphide.

In the present invention, doping of oxygen is accomplished by a flow-controlled carrier gas which includes a vapor of gallium monoxide. The carrier gas in the present embodiment is nitrogen. By this technique, oxygen can be doped more readily into the vicinity of the PN junction.

Figure 4:
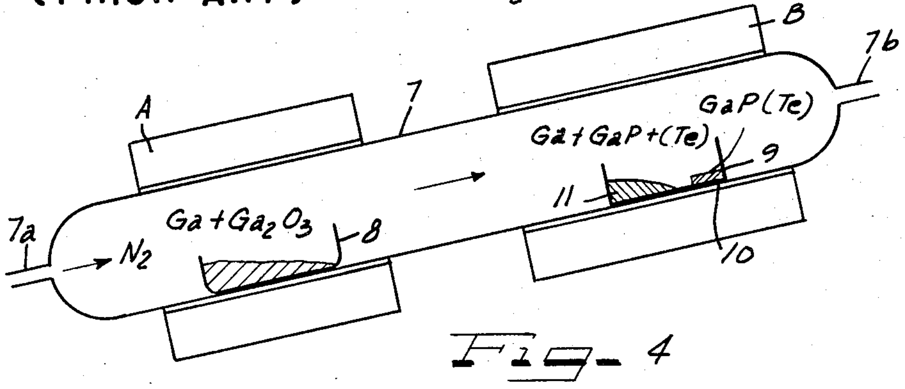
FIG. 4 shows a device for forming a luminescent diode according to the present invention and illustrates the positioning of a pair of boats within a fused quartz tube to accomplish the desired result.
Figure 5:
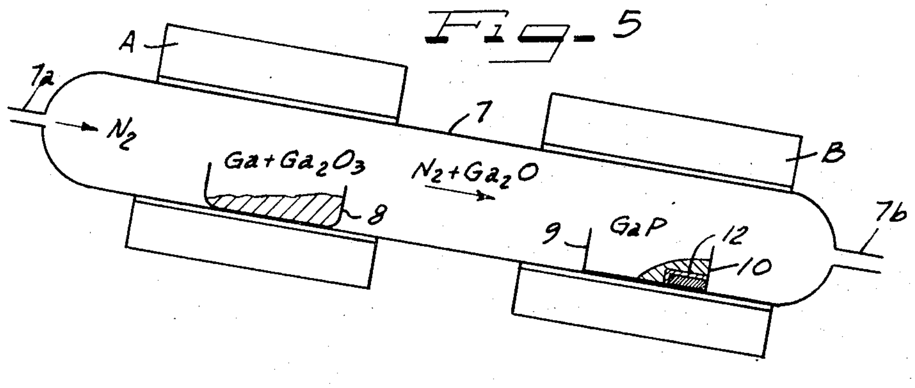
FIG. 5 illustrates the tube of FIG. 4 when inclined in such a way as to cause the melt to overlie the substrate and develop an epitaxial growth for forming a PN junction.

The present invention can be understood in connection with FIGS. 4 and 5. In FIG. 4, an open tube of quartz is indicated generally by the reference numeral 7. The tube 7 has an inlet **7*a* for an inert carrier gas such as nitrogen, argon or a mixture thereof. The tube 7 also has an outlet 7*b***.

Boats 8 and 9 are provided within the tube 7. The boat 9 contains a melt 11 and a substrate 10. The melt 11 contains gallium, gallium phosphide and tellurium, while the substrate 10 contains gallium phosphide with the donor impurity tellurium therein.

A pair of furnaces A and B are provided to heat the respective boats 8 and 9 to the required temperatures. For instance, the furnace A may heat the boat 8 to approximately 1050 to 1350 degrees centigrade, while the furnace B may heat the boat 9 to between 1050 and 1200 degrees centigrade.

When the boat 8 is heated, gallium monoxide gas is produced and flows to the boat 9 in combination with a carrier gas, namely nitrogen. The nitrogen is supplied from the inlet **7*a* toward the outlet 7*b* to carry the gallium monoxide across the melt 11** to allow oxygen to be diffused thereinto.

After sufficient oxygen is diffused into the melt, the boat 9 is inclined to the right as shown in FIG. 5 so that the melt overlies the substrate, and then the furnace B is stopped in such a manner that the melt 11 cools slowly to produce an epitaxial growth layer 12 containing oxygen and tellurium as impurities.

Figure 6:
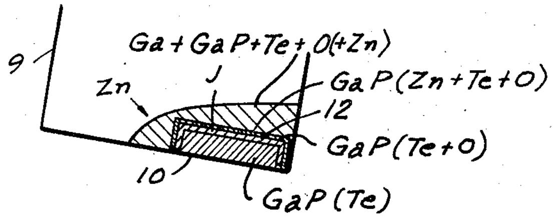
FIG. 6 is an enlarged view of one of the boats which is used in the tube of FIG. 5 and illustrating the position of the junction in the epitaxial layer.

Following the above described process, the resultant material is subjected to diffusion of zinc by a carrier gas with zinc vapor to form a PN junction J in the epitaxial growth layer as further illustrated in the enlarged drawing of FIG. 6. The diode produced by the above described process has a high luminescence efficiency for red emitting light.

As an alternate procedure, the zinc may be added to the melt prior to cooling and the epitaxial growth either by reacting zinc gas with the melt or supplying zinc powder into the melt.

The weight loss of oxide is related to the rate of flow of the carrier gas and the temperature of the boat as follows:

$$\frac{W/V}{(W/V)_0}=1-e^{-\frac{\alpha}{V}}$$

$$\alpha=\frac{AD}{\delta}$$

In the above formula, W is the weight loss of gallium monoxide and V is the rate of flow of the carrier gas with gallium monoxide vapor. $W/V$ in parenthesis with a small *o* at the lower right is the density of the gas loss when the flow is zero. A is the surface of the melt (approximately 2.8 centimeters squared). D is a diffusion constant of gallium monoxide. $\delta$ is the thickness of the diffusion layer.

If a tube of 24 millimeters in diameter is used, data relating to the temperature is given by the following table.

| | $(W/V)_0$, mg./cc. | $W \propto V$ region | $D/\delta$, cm./sec. |
|---|---|---|---|
| 1,150° C | 0.57 | Max. 4 cc./min | 11 |
| 1,100° C | 0.26 | Max. 8 cc./min | 16 |
| 1,050° C | 0.11 | Max. 10 cc./min | 17 |
| 1,000° C | 0.041 | Max. 12 cc./min | 25 |

The vapor pressure of gallium monoxide is given as follows:

| Boat temperature, ° C.: | Atmospheric pressure |
|---|---|
| 1150 | $4.3\times10^{-1}$ |
| 1100 | $1.9\times10^{-1}$ |
| 1050 | $7.9\times10^{-2}$ |
| 1000 | $2.8\times10^{-2}$ |

Figure 7:
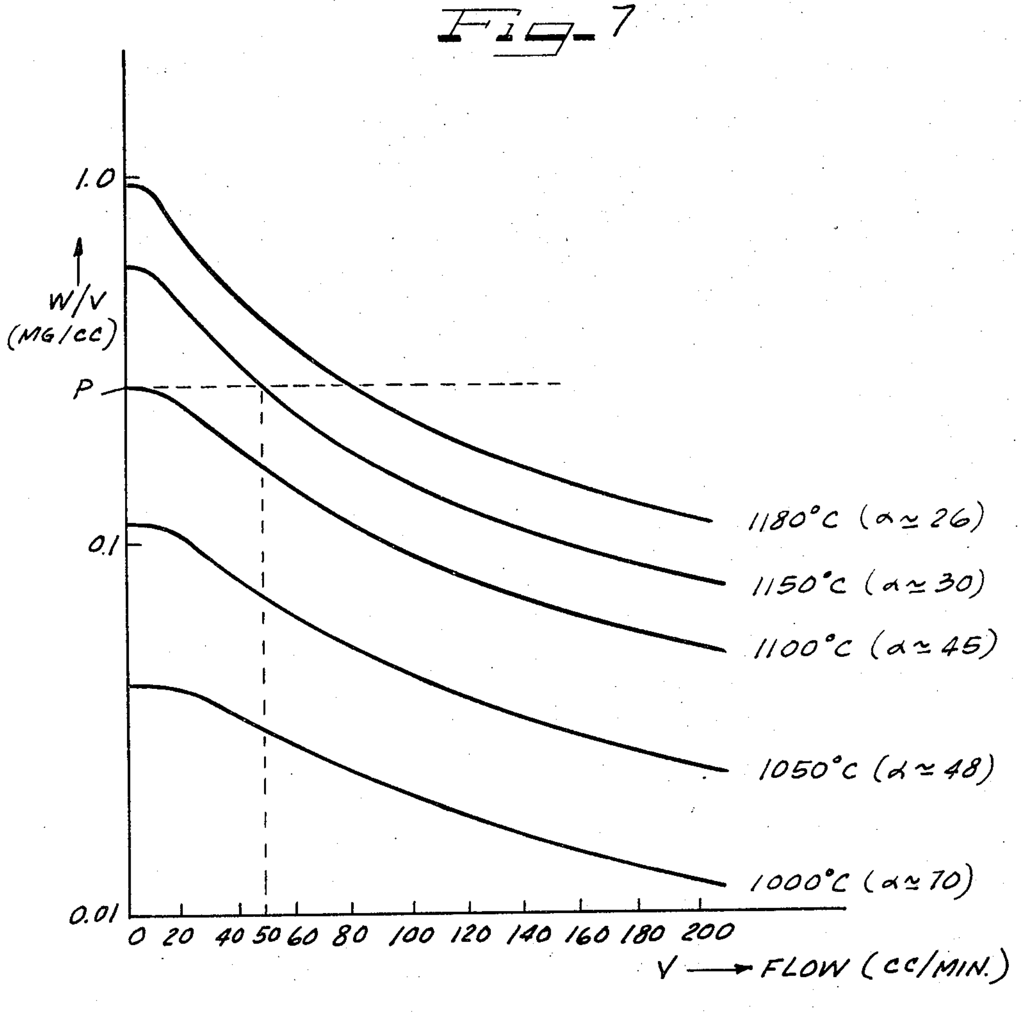
FIG. 7 is a chart showing the weight loss per unit of volume of the carrier gas when plotted against the flow rate of the gas in cubic centimeters per minute.

FIG. 7 shows relationships which have been obtained from the above equations and the above tables for various selected values of temperatures.

Referring further to FIG. 7, the point P thereon shows a saturation point for the doping of oxygen at 1100 degrees centigrade with a zero rate of flow of carrier gas. The equivalent oxygen doping may be obtained if the temperature of the boat 8 is 1150 degrees and a flow of carrier gas is selected at 50 cubic centimeters per minute as shown by the intersections of the dotted lines in FIG. 7. Accordingly, by following the chart, the amount of oxygen doping can be controlled by changing the temperature of the boat 8 and the rate of flow of the carrier gas.

According to the present invention, diodes having luminescence efficiencies as high as 2.7 percent have been obtained and average value being of .7 percent.

In addition to the above steps, gallium trioxide can also be added directly to the melt 11 to dope oxygen therein since the flow of gallium monoxide in the carrier gas prevents the gallium trioxide from being dispersed from the melt 11.

We claim as our invention:

1. A method of making a luminescent diode comprising the steps of:

providing a gallium phosphide substrate and a melt of gallium-gallium phosphide solution, passing a carrier gas containing gallium monoxide into contact with said melt to diffuse oxygen thereinto, and growing an epitaxial layer on said gallium phosphide substrate from said melt of gallium-gallium phosphide solution.

2. A method in accordance with claim 1 including the step of heating gallium and gallium trioxide to form gallium monoxide in said carrier gas.

3. A method in accordance with claim 2 wherein said carrier gas is nitrogen.

4. A method in accordance with claim 1 including diffusing zinc into said epitaxial layer to form a PN junction.

5. A method in accordance with claim 1 wherein zinc is supplied to said melt prior to the formation of the epitaxial layer.

6. A method of making a luminescent diode of gallium phosphide comprising the steps of providing a gallium phosphide substrate having a first type impurity, forming a melt of gallium-gallium phosphide solution including a first type impurity therein, forming a carrier gas having oxygen therein, contacting said carrier gas with said melt to diffuse said oxygen thereinto, growing an epitaxial layer on said substrate from said melt, and then adding a second impurity to said carrier gas whereby said second impurity is diffused into said epitaxial layer to define a PN junction therein.

References Cited

UNITED STATES PATENTS

| | | | |
|---|---|---|---|
| 3,549,401 | 12/1970 | Buszko et al. | 148—1.6 |
| 3,558,376 | 1/1971 | Schmidt et al. | 148—189 |
| 3,533,967 | 10/1970 | McNeely et al. | 148—1.6 |

RICHARD O. DEAN, Primary Examiner

U.S. Cl. X.R.

148—1.6, 172, 189, 190